United States Patent [19]

Grigsby, Jr. et al.

[11] Patent Number: 4,714,750

[45] Date of Patent: * Dec. 22, 1987

[54] SYNTHESIS OF PRODUCTS FROM POLYOXYALKYLENE AMINES AND 2,6-DI-T-BUTYLPHENOL FOR USE AS EPOXY ACCELERATORS AND CURING AGENTS

[75] Inventors: Robert A. Grigsby, Jr., Georgetown; George P. Speranza, Austin, both of Tex.

[73] Assignee: Texaco Inc., White Plains, N.Y.

[*] Notice: The portion of the term of this patent subsequent to Jul. 2, 2002 has been disclaimed.

[21] Appl. No.: 878,456

[22] Filed: Jun. 25, 1986

[51] Int. Cl.[4] .................. C08G 59/00; C08G 59/40; C08G 8/28; C08G 91/16

[52] U.S. Cl. ............................. 528/99; 528/107; 525/510; 564/367

[58] Field of Search ............... 528/99, 107; 525/510; 564/367

[56] References Cited

U.S. PATENT DOCUMENTS

| | | | |
|---|---|---|---|
| 3,734,965 | 5/1973 | Becker et al. | 564/367 |
| 4,122,287 | 10/1978 | Zakharova et al. | 568/784 |
| 4,242,212 | 12/1980 | Hanson | 98/58 |
| 4,269,742 | 5/1981 | Goeke et al. | 528/99 |
| 4,427,514 | 1/1984 | Kempter et al. | 528/99 |
| 4,501,595 | 2/1985 | Sung et al. | 98/119 |
| 4,526,972 | 7/1985 | Speranza et al. | 524/99 |

*Primary Examiner*—Harold D. Anderson
*Assistant Examiner*—Dennis R. Daley
*Attorney, Agent, or Firm*—Jack H. Park; Kenneth R. Priem

[57] ABSTRACT

Mannich condensates are prepared from 2,6-di-t-butylphenol, formaldehyde and a polyoxyalkylene amine. The novel compounds are useful as epoxy accelerators and curing agents.

33 Claims, No Drawings

SYNTHESIS OF PRODUCTS FROM POLYOXYALKYLENE AMINES AND 2,6-DI-T-BUTYLPHENOL FOR USE AS EPOXY ACCELERATORS AND CURING AGENTS

BACKGROUND OF THE INVENTION

1. Field of the Invention

This invention pertains to the Mannich reaction of 2,6-di-t-butylphenol with formaldehyde and a polyoxyalkylene amine, and the use of the products therefrom as epoxy accelerators and curing agents.

2. Description of the Related Art

The Mannich reaction is a well known reaction which has been extensively reviewed in the literature. See, for example, "The Mannich Reaction," *Org. Reactions* 1, 303 (1942) and "Advances in the Chemistry of Mannich Bases," *Methods in Synthetic Organic Chemistry - Synthesis*, Academic Press, pp. 703–775, 1973.

A representative patent illustrating the manner in which the Mannich reaction can be utilized to prepare useful products is U.S. Pat. No. 4,310,592 to Schmitz. Schmitz reacts an aliphatic amine and formaldehyde with phenol to provide an ortho substituted Mannich base condensate which is useful for increasing the water repellent properties of materials treated therewith.

Other patents describing the reaction of amines with phenols are DE No. 3124-370 and U.S. Pat. Nos. 3,734,965 and 4,357,181.

Related Coassigned Patents and Copending Applications

Coassigned U.S. Pat. No. 4,526,972 to Speranza, et al. describes the preparation of modified hindered polyoxyalkylene polyamines having the formula:

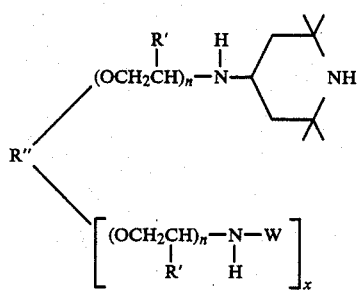

wherein R' represents hydrogen, methyl or ethyl, n represents a number having an average value of 1 to 70, x represents an integer having a value of 1 to 3, and R" represents an alkylene group or:

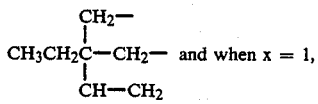

and when x = 1,

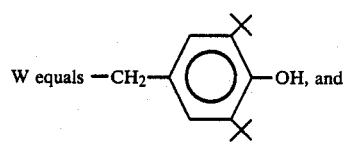

when x = 2, W equals H, or

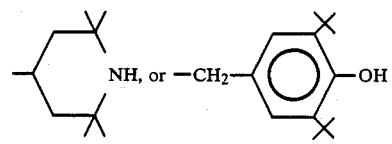

NH, or —CH$_2$—⟨⟩—OH

Coassigned copending U.S. patent application Ser. No. 621,332 describes Mannich condensates prepared from a phenol, formaldehyde and a polyoxyalkylene monoamine, and having the formula:

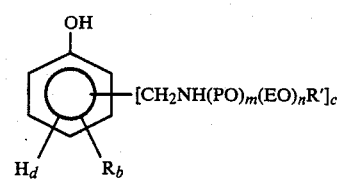

where b equals 0 to 2, c equals 1 to 2, d equals 1 to 4; and wherein R represents an alkyl group containing 1 to 20 carbon atoms, and where b equals 1 and is in the para position, may also represent a group having the formula:

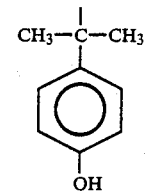

R' represents an alkyl group containing 1 to 20 carbon atoms, PO represents an oxypropyl group, EO represents an oxyethyl group, m is a number having a value of 1–50, and n is a number having a value of 0 to 50.

SUMMARY OF THE INVENTION

The invention is a compound having the formula:

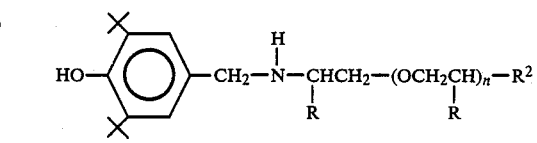

wherein (1) R represents hydrogen, —CH$_3$ or —CH$_2$CH$_3$; (2) n represents an integer having a value of 1 to 70, and (3) R$^2$ represents an alkoxyl group having 1 to 20 carbon atoms,

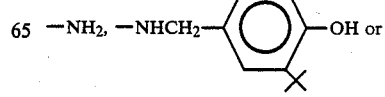

—NH$_2$, —NHCH$_2$—⟨⟩—OH or

-continued

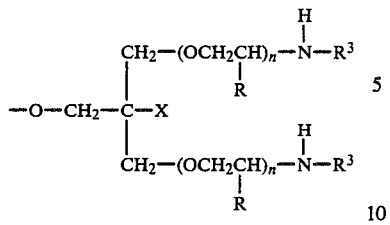

wherein R and n are defined as above, X represents hydrogen or an alkyl group containing from 1 to 3 carbon atoms, and $R^3$ represents hydrogen or

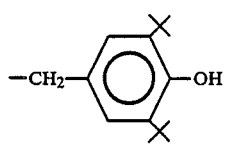

The invention is also a method for making the compounds described above, and the use of said compounds as epoxy accelerators and curing agents.

DESCRIPTION OF THE PREFERRED EMBODIMENTS

The Mannich reaction involves the reaction of an acidic hydrogen with formaldehyde and an amino base. It has been surprisingly discovered in accordance with the present invention that a new class of Mannich condensates are provided when 2,6-di-t-butylphenol is reacted with formaldehyde and a polyoxyalkylene amine (as hereinafter described).

The reaction may be depicted by the following general equation:

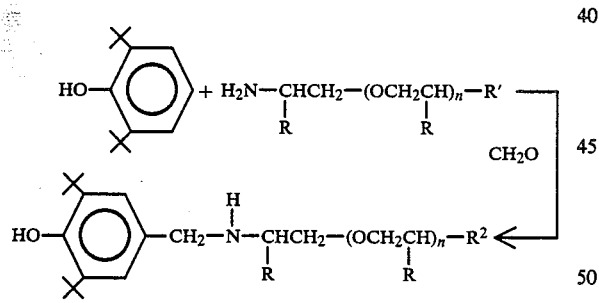

wherein (1) R represents hydrogen, —$CH_3$ or —$CH_2CH_3$, (1) n represents an integer having a value of 1 to 70, (3) R' represents an alkoxyl group having 1 to 20 carbon atoms, —$NH_2$ or

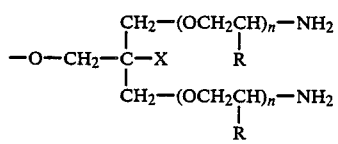

wherein R and n are defined as above, and X represents hydrogen or an alkyl group containing from 1 to 3 carbon atoms, and (4) $R^2$ represents an alkoxyl group having 1 to 20 carbon atoms

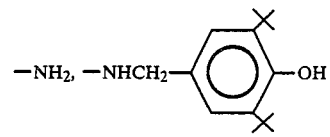

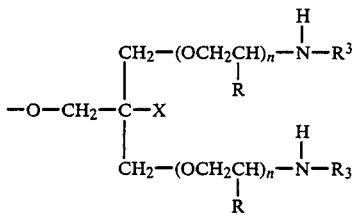

wherein R, X and n are defined as above, and $R_3$ represents hydrogen or

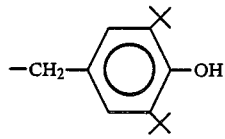

Starting Materials

2,6-di-tertiarybutylphenol 2,6-di-t-butylphenol can be represented structurally by structural formula I given below, or graphically by graphic formula II.

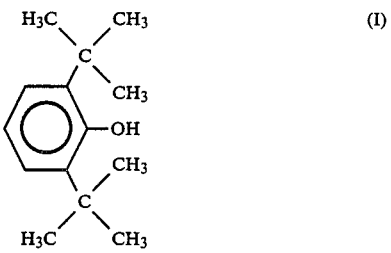

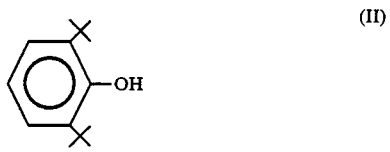

The Formaldehyde

The formaldehyde may be employed in any of its conventional forms. Thus it may be used in the form of an aqueous solution of formaldehyde such as "formalin", in "inhibited" methanol solution, as paraformaldehyde, or as trioxane.

Polyoxyalkylene Amine

Examples of suitable polyoxyalkylene amine starting materials may be structurally represented by one or more of the following formulas:

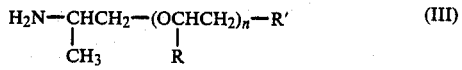

wherein R represents hydrogen, —CH₃ or —CH₂CH₃, R' represents $C_{1-12}$ alkoxy or $C_{1-12}$ alkoxyethoxy and n represents an integer having a value of about 2 to about 40.

Examples of materials having this structural formula include a material having a molecular weight of about 300 wherein R is methyl, and R' represents an alkoxy $C_{10-12}$ group; a material having an average molecular weight of about 360 where R' represents a standard butoxy group and R is hydrogen or methyl, with a ratio of methyl to hydrogen of about 2 to 3; a material having an average molecular weight of 600 wherein R' is methoxyethoxy, R is methyl and n has a value of about 9; a material having an average molecular weight of about 1000 wherein R' is methoxyethoxy, R is hydrogen or methyl with a ratio of methyl to hydrogen of 3 to 18; a material having an average molecular weight of about 2000 wherein R' is methoxyethoxy, wherein R is primarily H with a ratio of methyl to hydrogen of about 32 to 2; and a material having a molecular weight of about 2000 wherein R' is methoxyethoxy, R is hydrogen or methyl with a ratio of methyl to hydrogen of 10 to 31.

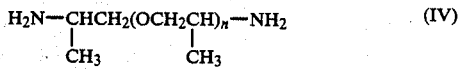

wherein n had an average value of from about 2 to about 70.

Representative materials having this structural formula include a material having a molecular weight of 230 wherein n has a value between about 2 and 3, a material having an average molecular weight of about 400 wherein n has a value between about 5 and 6, a material having a molecular weight of about 2000 wherein n has a value of about 33, and a product having a molecular weight of about 4000 where n has a value of about 60.

Another example of a class of polyoxyalkylene amines useful as raw materials in accordance with the present invention are those having formula V given below:

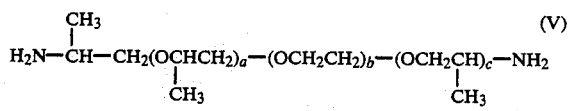

wherein a +c equals 2 to 10 and b is a number having a value of from about 1 to 50.

Examples of materials having this general formula include a commercial product having an average molecular weight of about 600 wherein the value of b is about 8.5 and the value of a+c is about 2.5, a material having an average molecular weight of about 900 wherein the value of a+c is again 2.5 and the value of b is about 15.5. Other examples wherein a+c has a value of about 2.5 include a material having an average molecular weight of about 2000 wherein the value of b is about 40 and a material having a molecular weight of about 4000 wherein the value of b is about 85.

A further example of a class of polyoxyalkylene polyamines useful as starting materials in the present invention include those having the formula VI given below:

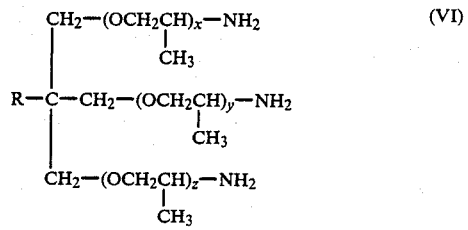

wherein R is an alkyl group containing from 1 to 3 carbon atoms and x, y and z represent integers, the sum of which is from about 5 to about 90.

Preparation of the Mannich Condensates

The relative quantities of 2,6-di-t-butylphenol, formaldehyde and polyoxyalkylene amine will be determined by the characteristics of the final product desired. If it is desirable that the final product contain only one 2,6-di-t-butylphenol group, then the 2,6-di-t-butylphenol, the polyoxyalkylene amine starting material and the formaldehyde should be used in approximately equimolar amounts. If it is desirable that the product contain two 2,6-di-t-butylphenol groups, about 2 moles of 2,6-di-t-butylphenol and about 2 moles of formaldehyde should be used per mole of polyoxyalkylene amine. If the polyoxyalkylene amine starting material is a triamine, and a product containing three 2,6-di-t-butylphenol groups is desired, approximately three moles of 2,6-di-t-butylphenol and about three moles of formaldehyde should be used per mole of polyoxyalkylene amine.

The reaction may be conducted at a temperature range of from about 0° C. to about 150° C. and at a pressure from atmospheric to about 1000 psig. The reaction is preferably conducted within a temperature range of about 80° to about 120° C. for the lower molecular weight product; i.e. where the amine has an average molecular weight of about 250 to about 500. However, when higher molecular weight amines are used, such as those having molecular weights within the range of about 500 to about 2000, it is necessary to use higher temperatures and/or pressures, such as temperatures within the range of about 100° to about 150° C. and pressures within the range of about 1 atmosphere to about 50 atmospheres.

Curing Agent for Epoxy Base Resins

The compounds described and claimed herein are useful for curing epoxy base resins. In addition, the compounds act as accelerators. Generally, the epoxy base resin is a vicinal polyepoxide containing compound having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by known procedures of reacting epichlorohydrin and an aromatic polyhydroxy compound; i.e., isopropylidene bisphenol, novolac, resorcinol, derivatives of aromatic amines, etc. The epoxy derivatives of methylene or isopropylidene bisphenols are especially preferred. The condensation product of epichlorohydrin with Bisphenol A is particularly preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive 1,2-epoxy groups per molecule. An illustrative, but by no means exhaustive, listing of suitable dihydric phenols includes 4,4-isopropylidene bisphenol, 2,4-dihydroxydiphenylethylmethane, 3,3'-dihydroxydiphenoldiethylmethane, 3,4-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis4-hydroxycyclohexyl)dimethylmethane, 1,4-dimethylolbenzene, glycerol, 1,2,6-hexantriol, trimethylolpropane, mannitol, sorbitol, erythritol, pentaerythritol, their dimers, trimers and higher polymers; e.g. polyethylene glycols, polypropylene glycols, triglycerol, dipentaerythritol and the like, polyallyl alcohol, polyhydric thioethers, such as 2,2'-3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol. Further details concerning the nature and preparation of these epoxy novolac resins can be obtained in Lee, H. and Neville, K., *Handbook of Epoxy Resins*, McGraw-Hill Book Co., New York, 1967.

It will be appreciated by those skilled in the art that the polyepoxide compositions which are useful according to the practice of the present invention are not limited to those containing the above described polyepoxides, but that these poyepoxides are to be considered merely as being representative of the class of polyepoxides as a whole.

To cure the epoxy resin, the curing agent is mixed with the polyepoxide in an amount such that there is one reactive hydrogen atom in the curing component for each epoxy group in the epoxy resin component. The stoichiometric quantity can be calculated from the knowledge of the chemical structure and analytical data on the component. When stoichiometry is not calculable, the proper amount of curative is that amount necessary to produce the most advantageous properties. This amount must be determined experimentally and can be accomplished by routine procedures known in the art. Generally, the number of equivalents of reactive curative groups is from about 0.8 to 1.2 times the number of epoxide equivalents present in the curable epoxy resin composition, with from 0.9 to a stoichiometric amount being preferred. The exact amount of constituents in accordance with the above general requirements will depend, as mentioned, primarily on the application for which the cured resin is intended.

The invention will be further illustrated by the following non-limiting examples.

EXAMPLE 1

To a 250 ml three-neck flask, equipped with a mechanical stirrer, a dropping funnel, and a source of nitrogen, 2,6-di-t-butylphenol (50.0 g, 0.243 m) and JEFFAMINE ® ED-600 amine (77.82 g, 0.121 m) were added to the reaction flask. Formalin (20.0 g, 0.243 m) was added dropwise, with stirring, to the reaction flask. The turbid solution was then heated to 100° C. for 11 hours. During the 11 hours, the water, from the formalin, was distilled out of the reaction flask. A water aspirator vacuum was then pulled on the reaction flask at the end of the 11 hours to ensure that all of the water was removed from the reaction product.

The recovered product, a red liquid, 120.1 g, was slightly soluble in water. NMR analysis indicated that all of the phenol was substituted in the 2, 4, and 6 positions. No starting material was present. IR analysis indicated a free hydroxyl was present in the product. Other analyses on the product were as follows: hydroxyl number=107, total amine=1.79 meq/g, secondary and tertiary amine=1.29 meq/g and tertiary amine=0.02 meq/g.

EXAMPLE 2

To a 250 ml three-neck flask, equipped with a mechanical stirrer and a source of nitrogen, 2,6-di-t-butylphenol (25.0 g, 0.121 m) JEFFAMINE ® M-1000 amine (121.4 g, 0.121 m) and formalin (10.0 g, 0.121 m) were added to the reaction flask. The turbid solution was then heated to 90° C. for 8 hours. During the 8 hours, some water, from the formalin, was distilled out of the reaction flask. A high vacuum was then pulled on the reaction flask, for 30 minutes, to ensure that all of the water was removed from the reaction product.

The product, a dark purple solid, was recovered. Analyses of the product were as follows: hydroxyl number=36.2, total amine=0.61 meq/g, secondary and tertiary amine=0.32 meq/g and tertiary amine=0.02 meq/g.

EXAMPLE 3

To a 250 ml three-neck flask, equipped with a stirring bar and a source of nitrogen, 2,6-di-t-butylphenol (25.0 g, 0.121 m), JEFFAMINE ® M-1000 amine (121.4 g, 0.121 m) and formalin (10.0 g, 0.121 m) were added to the reaction flask. The turbid solution was then heated to 90° C. for 4.25 hours. During this time, some water, from the formalin, was distilled out of the reaction flask. A high vacuum was then pulled on the reaction flask, for 30 minutes, to ensure that all of the water was removed from the reaction product.

The product, a dark solid, was recovered. NMR analysis indicated that 90% of the phenol was substituted in the 2, 4, and 6 positions. IR analysis indicated a free hydroxyl was present in the product. Other analyses on the product were as follows: hydroxyl number=41.0, total amine=0.67 meq/g, secondary and tertiary amine=0.62 meq/g and tertiary amine=0.01 meq/g.

EXAMPLE 4

To a 250 ml three-neck flask, equipped with a stirring bar and a source of nitrogen, 2,6-di-t-butylphenol (40.0 g, 0.19 m), JEFFAMINE ® M-600 amine (116.5 g, 0.19 m) and formalin (15.7 g, 0.19 m) were added to the reaction flask. The turbid solution was then heated to 90° C. for 6 hours. During this time, some water, from the formalin, was distilled out of the reaction flask. A high vacuum was then pulled on the reaction flask, for 30 minutes, at 140° C., to ensure that all of the water was removed from the reaction product.

The product, a dark liquid, was recovered. NMR analysis indicated that 90% of the phenol was substituted in the 2, 4, and 6 positions. IR analysis indicated a free hydroxyl was present in the product. Other analyses on the product were as follows: hydroxyl number=77.4, total amine=1.27 meq/g, secondary and tertiary amine=1.23 meq/g and tertiary amine=0.02 meq/g.

EXAMPLE 5

To a 250 ml three-neck flask, equipped with a mechanical stirrer and a source of nitrogen, 2,6-di-t-butylphenol (75.0 g, 0.36 m), JEFFAMINE ® D-400 amine (72.8 g, 0.18 m) were added to the reaction. Formalin (29.5 g, 0.36 m) was added slowly to the mixture at 50° C. The turbid solution was then heated to 90°-100° C. for 14 hours. During this time, the water, from the formalin, was distilled out of the reaction flask.

The product, a thick brown liquid, 151.1 g, was recovered. NMR analysis indicated that 90% of the phenol was substituted in the 2, 4, and 6 positions. IR analysis indicated a free hydroxyl was present in the product. Other analyses on the product were as follows: hydroxyl number=133, total amine=2.24 meq/g, secondary and tertiary amine=1.36 meq/g and tertiary amine=0.01 meq/g.

EXAMPLE 6

To a 250 ml three-neck flask, equipped with a mechanical stirrer and a source of nitrogen, 2,6-di-t-butylphenol (45.8 g, 0.22 m) was added to a solution of JEFFAMINE ® ED-900 amine (100.0 g, 0.11 m) and formalin (18.02, 0.22 m). The solution was then heated to 90°-100° C. for 9 hours. During this time, some water, from the formalin, was distilled out of the reaction flask. A high vacuum was then pulled on the reaction flask, for 30 minutes, at 110° C., to ensure that all of the water was removed from the reaction product.

The product, a red-brown thick liquid, 147.0 g, was recovered. NMR analysis indicated that 100% of the phenol was substituted in the 2, 4, and 6 positions. IR analysis indicated a free hydroxyl was present in the product. Other analyses on the product were as follows: hydroxyl number=76.1, total amine=1.32 meq/g, secondary and tertiary amine=0.93 meq/g and tertiary amine=0.08 meq/g.

EXAMPLE 7

To a 250 ml three-neck flask, equipped with a mechanical stirrer and a source of nitrogen, 2,6-di-t-butylphenol (42.9 g, 0.21 m) was added to a solution of JEFFAMINE ® M-360 amine (75.0 g, 0.21 m) and formalin (16.92, 0.21 m). The turbid solution was then heated to 92° C. for 7 hours. During this time, some water, from the formalin, was distilled out of the reaction flask. A high vacuum was then pulled on the reaction flask, for 30 minutes, at 110° C., to ensure that all of the water was removed from the reaction product.

The product, a brown thick liquid, 118.8 g, was recovered. NMR analysis indicated that 100% of the phenol was substituted in the 2, 4, and 6 positions. IR analysis indicated a free hydroxyl was present in the product. Other analyses on the product were as follows: hydroxyl number=96.5, total amine=1.65 meq/g, secondary and tertiary amine=1.05 meq/g and tertiary amine=0.06 meq/g.

EXAMPLE 8

To a 250 ml three-neck flask, equipped with a mechanical stirrer and a source of nitrogen, 2,6-di-t-butylphenol (27.5 g, 0.13 m) was added to a solution of JEFFAMINE ® ED-600 amine (80.0 g, 0.13 m) and formalin (10.82, 0.13 m). The solution was then heated to 90° C. for 6 hours. During this time, some water, from the formalin, was distilled out of the reaction flask. A high vacuum was then pulled on the reaction flask, for 30 minutes, at 110° C., to ensure that all of the water was removed from the reaction product.

The product, a light-yellow liquid, 108.6 g, was recovered. NMR analysis indicated that 90-95% of the phenol was substituted in the 2, 4, and 6 positions. IR analysis indicated a free hydroxyl was present in the product. Other analyses on the product were as follows: hydroxyl number=136, total amine=2.29 meq/g, secondary and tertiary amine=0.68 meq/g and tertiary amine=0.01 meq/g.

EXAMPLE 9

To a 250 ml three-neck flask, equipped with a mechanical stirrer and a source of nitrogen, 2,6-di-t-butylphenol (51.1 g, 0.25 m) was added to a solution of JEFFAMINE ® T-403 amine (100.0 g, 0.25 m) and formalin (20.1 g, 0.25 m) at 70° C. The solution was then heated to 90° C. for 8 hours. During this time, some water, from the formalin, was distilled out of the reaction flask. A high vacuum was then pulled on the reaction flask, for 30 minutes, at 94° C., to ensure that all of the water was removed from the reaction product.

The product, a yellow liquid, 152.9 g, was recovered. NMR analysis indicated that 80% of the phenol was substituted in the 2, 4, and 6 positions. IR analysis indicated a free hydroxyl was present in the product. Other analyses on the product were as follows: hydroxyl number=239, total amine=4.32 meq/g, secondary and tertiary amine=1.21 meq/g and tertiary amine=0.02 meq/g.

EXAMPLE 10

To a 250 ml three-neck flask, equipped with a mechanical stirrer and a source of nitrogen, 2,6-di-t-butylphenol (89.6 g, 0.44 m) was added to a solution of JEFFAMINE ® D-230 amine (50.0 g, 0.22 m) and formalin (35.3, 0.44 m) at 70° C. The solution was then heated to 90° C. for 10 hours. During this time, some water, from the formalin, was distilled out of the reaction flask. A high vacuum was then pulled on the reaction flask, for 30 minutes, at 120° C., to ensure that all of the water was removed from the reaction product.

The product, a red-brown thick liquid, 142.4 g, was recovered. NMR analysis indicated that 95% of the phenol was substituted in the 2, 4, and 6 positions. IR analysis indicated a free hydroxyl was present in the product. Other analyses on the product were as follows: total amine=2.90 meq/g, secondary and tertiary amine=2.01 meq/g and tertiary amine=0.02 meq/g.

EXAMPLE 11

To a 250 ml three-neck flask, equipped with a mechanical stirrer and a source of nitrogen, 2,6-di-t-butylphenol (102.2 g, 0.50 m) was added to a solution of JEFFAMINE® T-403 amine (100.0 g, 0.25 m) and formalin (40.3 g, 0.50 m) at 67° C. The solution was then heated to 90° C. for 10.5 hours. During this time, some water, from the formalin, was distilled out of the reaction flask. A high vacuum was then pulled on the reaction flask, for 30 minutes, at 100° C., to ensure that all of the water was removed from the reaction product.

The product, a yellow solid, 203.6 g, was recovered. NMR analysis indicated that 90–95% of the phenol was substituted in the 2, 4, and 6 positions. IR analysis indicated a free hydroxyl was present in the product. Other analyses on the product were as follows: total amine=3.22 meq/g, secondary and tertiary amine=1.75 meq/g and tertiary amine=0.01 meq/g.

EXAMPLE 12

To a 250 ml three-neck flask, equipped with a mechanical stirrer and a source of nitrogen, 2,6-di-t-butylphenol (75.0 g, 0.36 m) was added to a solution of JEFFAMINE® D-230 amine (83.7 g, 0.36 m) and formalin (29.5 g, 0.36 m) at 65° C. The solution was then heated to 90° C. for 4.0 hours. During this time, some water, from the formalin, was distilled out of the reaction flask. A high vacuum was then pulled on the reaction flask, for 30 minutes, at 100° C., to ensure that all of the water was removed from the reaction product.

The product, an orange liquid, 161.8 g, was recovered. NMR analysis indicated that 90–95% of the phenol was substituted in the 2, 4, and 6 positions. IR analysis indicated a free hydroxyl was present in the product.

EXAMPLE 13

To a 250 ml three-neck flask, equipped with a mechanical stirrer and a source of nitrogen, 2,6-di-t-butylphenol (50.0 g, 0.24 m) was added to a solution of JEFFAMINE® D-400 amine (97.1 g, 0.24 m) and formalin (19.7 g, 0.24 m) at 62° C. The solution was then heated to 90° C. for 4.0 hours. During this time, some water, from the formalin, was distilled out of the reaction flask. A high vacuum was then pulled on the reaction flask, for 30 minutes, at 100° C., to ensure that all of the water was removed from the reaction product.

The product, a light-brown liquid, 142.2 g, was recovered. NMR analysis indicated that 90–95% of the phenol was substituted in the 2, 4, and 6 positions.

EXAMPLE 14

To a 500 ml three-neck flask, equipped with a mechanical stirrer and a source of nitrogen, 2,6-di-t-butylphenol (97.4 g, 0.47 m) was added to a solution of triglycol diamine (70.0 g, 0.47 m) and formalin (38.8 g, 0.48 m) at 28° C. The solution was then heated to 90° C. for 10.5 hours. During this time, some water, from the formalin, was distilled out of the reaction flask. A high vacuum was then pulled on the reaction flask, for 30 minutes, at 100° C., to ensure that all of the water was removed from the reaction product.

The product, a light-yellow liquid, 152.1 g, was recovered. NMR analysis indicated that 90% of the phenol was substituted in the 2, 4, and 6 positions.

EXAMPLE 15

To a 500 ml three-neck flask, equipped with a mechanical stirrer and a source of nitrogen, 2,6-di-t-butylphenol (153.3 g, 0.74 m) was added to a solution of JEFFAMINE® T-403 amine (300.0 g, 0.74 m) and formalin (62.0 g, 0.76 m) at 28° C. The solution was then heated to 90° C. for 10.5 hours. During this time, some water, from the formalin, was distilled out of the reaction flask. A high vacuum was then pulled on the reaction flask, for 30 minutes, at 100° C., to ensure that all of the water was removed from the reaction product.

The product, a thick yellow liquid, 266.6 g, was recovered. NMR analysis indicated that 40–50% of the phenol was substituted in the 2, 4, and 6 positions. Other analyses on the product were as follows: total amine=2.2 meq/g, secondary and tertiary amine=1.05 meq/g and tertiary amine=0.01 meq/g.

EXAMPLE 16

To a 500 ml three-neck flask, equipped with a mechanical stirrer and a source of nitrogen, 2,6-di-t-butylphenol (3.73 g, 0.02 m) was added to a solution of JEFFAMINE® T-5000 amine (100.0 g, 0.02 m) and formalin (1.50 g, 0.02 m) at 28° C. The solution was then heated to 90° C. for 11.0 hours. During this time, some water, from the formalin, was distilled out of the reaction flask. A high vacuum was then pulled on the reaction flask, for 30 minutes, at 100° C., to ensure that all of the water was removed from the reaction product.

The product, a thick green liquid, 102.3 g, was recovered. NMR analysis indicated that 30–50% of the phenol was substituted in the 2, 4, and 6 positions.

EXAMPLE 17

To a 500 ml three-neck flask, equipped with a mechanical stirrer and a source of nitrogen, 2,6-di-t-butylphenol (111.4 g, 0.54 m) and triglycoldiamine (40.0 g, 0.27 m) were added to the flask. Formalin (43.9 g, 0.54 m) was added slowly to the stirred solution at 28° C. The solution was then heated to 100° C. for 16.0 hours. During this time, some water, from the formalin, was distilled out of the reaction flask. A high vacuum was then pulled on the reaction flask, for 30 minutes, at 100° C., to ensure that all of the water was removed from the reaction product.

The product, light-yellow liquid, 114.7 g, was recovered. NMR analysis indicated that 90–95% of the phenol was substituted in the 2, 4, and 6 positions.

EXAMPLE 18

To a 500 ml three-neck flask, equipped with a mechanical stirrer and a source of nitrogen, 2,6-di-t-butylphenol (70.0 g, 0.34 m) and JEFFAMINE® ED-600 amine (224.3 g, 0.38 m) were added to the flask. Formalin (27.6 g, 0.34 m) was added slowly to the stirred solution at 33° C. The solution was then heated to 90° C. for 6.0 hours. During this time, some water, from the formalin, was distilled out of the reaction flask. A high vacuum was then pulled on the reaction flask, for 30 minutes, at 100° C., to ensure that all of the water was removed from the reaction product.

The product, yellow liquid, 296.8 g, was recovered. NMR analysis indicated that >90% of the phenol was substituted in the 2, 4, and 6 positions. This product had a cloud point at or near room temperature.

EXAMPLE 19

To a 500 ml three-neck flask, equipped with a mechanical stirrer and a source of nitrogen, 2,6-di-t-butylphenol (70.0 g, 0.34 m) and JEFFAMINE ® ED-900 amine (321.1 g, 0.36 m) were added to the flask. Formalin (27.6 g, 0.34 m) was added slowly to the stirred solution at 33° C. The solution was then heated to 90° C. for 10.0 hours. During this time, some water, from the formalin, was distilled out of the reaction flask. A high vacuum was then pulled on the reaction flask, for 30 minutes, at 100° C., to ensure that all of the water was removed from the reaction product.

The product, yellow liquid, 390.9 g, was recovered. NMR analysis indicated that >90% of the phenol was substituted in the 2, 4, and 6 positions. Other analyses on the product were as follows: total amine=1.65 meq/g, secondary and tertiary amine=0.43 meq/g and tertiary amine=0.01 meq/g. This product had a cloud point of 67° C.

Examples 20 and 21 illustrate that the products, made above, are useful as epoxy curing agents and as epoxy accelerators. Example 20 illustrates an epoxy system where all the amine groups react with all of the epoxy groups. Examples 21 illustrates the use of excess amine to cure an epoxy resin.

EXAMPLE 20

Two epoxy resins, one made with the amine prepared in Example 9 and the other epoxy cured with a commercial amine, JEFFAMINE ® T-403 amine (the control), were compared together to determine if the amine, prepared in Example 9, had any effect as an epoxy accelerating agent. The control epoxy resin was prepared by mixing JEFFAMINE ® T-403 amine (30.0 g) and Epon ® 828* (75.9 g) together. The other epoxy resin was prepared by mixing Example 9 (20.0 g) and Epon 828 (27.4 g) together. Each epoxy resin was poured into a cup (20 cc) and poured onto the surface of a 15 mm×7 mm cool rolled plate. After 7 hours of curing at room temperature, the control epoxy was still fluid while the epoxy made from Example 9 was sticky and thick. After 23 hours at room temperature, the control was starting to cure up. It was sticky and thick. The epoxy resin made from Example 9 and Epon 828 was hard and was not sticky after 23 hours of curing at room temperature.

*Diglycidol ether of Bisphenol A (Shell).

EXAMPLE 21

Example 21 was completed in the same manner as Example 20 except excess amine was present in the epoxy resins. The control was made by mixing JEFFAMINE ® T-403 amine (30.0 g) and Epon 828 (16.9 g) together. The other epoxy resin was prepared by mixing Example 9 (30.0 g) and Epon 828 (9.81 g) together. After curing both resins at room temperature for 24 hours, the control resin was very fluid while the resin made from Example 9 and Epon 828 was thick. After four days of curing at room temperature, the control epoxy resin was thick and sticky while the other resin was hard and not sticky.

These Examples, 20 and 21, illustrate that the product made from 2,6-di-t-butylphenol, formaldehyde, and JEFFAMINE ® T-403 amine (Example 9) does function as an epoxy accelerating agent. The 2,6-di-t-butylphenol group should also function as an antioxidant.

TABLE I

SYNTHESIS OF PRODUCTS MADE FROM JEFFAMINE ® AMINES AND 2,6-DI-T-BUTYL PHENOL

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 2,6-di-t-butyl phenol | | | | | | | | | | | | |
| Grams | 50 | 25 | 25 | 40 | 75 | 45.8 | 42.9 | 27.5 | 51.1 | 89.6 | 102.2 | 75 |
| Moles | 0.243 | 0.121 | 0.121 | 0.19 | 0.364 | 0.22 | 0.208 | 0.133 | 0.248 | 0.437 | 0.496 | 0.36 |
| Amine[13] | ED-600[1] | M-1000[2] | M-1000 | M-600[3] | D-400[4] | ED-900[5] | M-360[6] | ED-600 | T-403[7] | D-230[8] | T-403 | D-230 |
| Grams | 72.8 | 121.4 | 121.4 | 116.5 | 72.8 | 100 | 75 | 80 | 100 | 50 | 100 | 83.7 |
| Moles | 0.121 | 0.121 | 0.121 | 0.19 | 0.182 | 0.11 | 0.208 | 0.133 | 0.248 | 0.217 | 0.248 | 0.36 |
| Formalin | | | | | | | | | | | | |
| Moles | 0.243 | 0.121 | 0.121 | 0.19 | 0.364 | 0.22 | 0.208 | 0.133 | 0.248 | 0.437 | 0.496 | 0.36 |
| Time, Hrs | 11 | 8 | 4.25 | 6 | 14 | 9 | 7 | 6 | 8 | 10 | 10.5 | 4 |
| Temperature, °C. | 100 | 90 | 90 | 90 | 90–100 | 90–100 | 92 | 90 | 90 | 90 | 90 | 90 |
| Phenol Reacted, %[11] | >90 | — | >90 | >90 | 90 | 100 | 100 | 90–95 | 80 | 95 | 90–95 | 90–95 |
| IR | FR OH | — | FR OH | FR OH | — | FR OH | — | | | Free OH | | |
| Color[12] | R.L. | GR.S. | DK.S. | DK.L. | R.B.L. | R.B.L. | BL. | L.Y.L. | Y.L. | R.B.L. | Y.S. | O.L. |
| Hydroxyl No. | 107 | 36.2 | 41 | 77.4 | 133 | 76.1 | 96.5 | 136 | 239 | | | |
| Total Amine | 1.79 | 0.61 | 0.67 | 1.27 | 2.24 | 1.32 | 1.65 | 2.29 | 4.32 | 2.9 | 3.22 | |
| Sec. & tert. amine | 1.29 | 0.32 | 0.62 | 1.23 | 1.36 | 0.93 | 1.05 | 0.68 | 1.21 | 2.0 | 1.75 | |
| Tert. amine | 0.02 | 0.02 | 0.01 | 0.02 | 0.01 | 0.08 | 0.06 | 0.01 | 0.02 | 0.02 | 0.01 | |

TABLE II

SYNTHESIS OF PRODUCTS MADE FROM JEFFAMINE ® AMINES AND 2,6-DI-T-BUTYL PHENOL

| | Example No. | | | | | | |
|---|---|---|---|---|---|---|---|
| | 13 | 14 | 15 | 16 | 17 | 18 | 19 |
| 2,6-di-t-butyl phenol | | | | | | | |
| Grams | 50 | 97.4 | 153.3 | 3.73 | 111.4 | 70.0 | 70.0 |
| Moles | 0.24 | 0.47 | 0.74 | 0.018 | 0.54 | 0.39 | 0.339 |
| Amine | D-400 | TGDA[9] | T-403 | T-5000[10] | TGDA | ED-900 | ED-600 |
| Grams | 97.1 | 70 | 300 | 100 | 40.0 | 321.1 | 224.3 |
| Moles | 0.24 | 0.47 | 0.74 | 0.02 | 0.27 | 0.357 | 0.373 |

TABLE II-continued

| Formalin | | | | | | | |
|---|---|---|---|---|---|---|---|
| Moles | 0.24 | 0.48 | 0.76 | 0.018 | 0.54 | 0.339 | 0.339 |
| Time, Hrs | 4 | 10.5 | 10.5 | 11.25 | 16 | 6 | 10 |
| Temperature, °C. | 90 | 90 | 90 | 90 | 100 | 90 | 90 |
| Phenol Reacted, %[11] | 90-95 | 90 | 40-50 | 30-50 | 90-95 | — | <90 |
| Color[12] | LT.B.L. | LT.Y.L. | T.Y.L. | LT.G.L. | Y.L. | Y.L. | Y.L. |
| Total Amine | | | 2.2 | | | | 1.65 |
| Sec. and tert. amine | | | 1.05 | | | | 0.43 |
| Sec. and tert. amine | | | <0.01 | | | | <0.01 |

Footnotes for Tables I and II

[1]ED-600
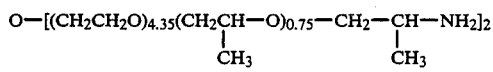

[2]M-1000
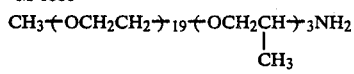

[3]M-600
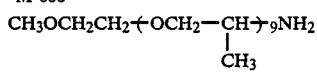

[4]D-400
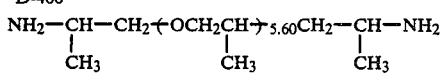

[5]ED-900
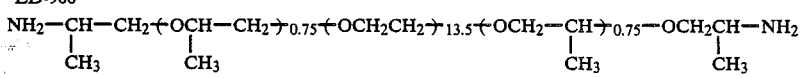

[6]M-360
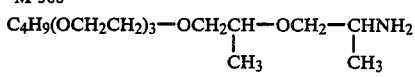

[7]T-403
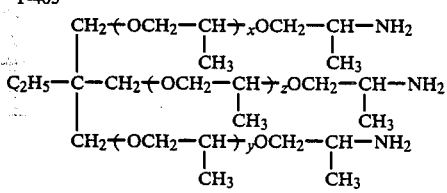

x + y + z = 5.3

[8]D-230
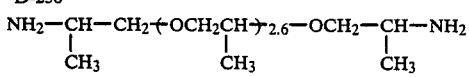

[9]Triglycol diamine
NH$_2$CH$_2$CH$_2$OCH$_2$CH$_2$OCH$_2$CH$_2$NH$_2$

[10]T-5000
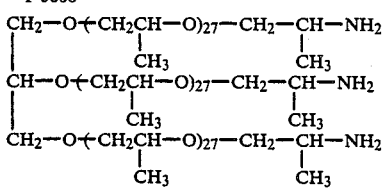

[11]The percent phenol reacted was determined by NMR analysis.
[12]The color abbreviations are as follows: Solid—S., Liquid—L., Red—R., Yellow—Y., Brown—B., Blue—Bl., Light—Lt., Dark—Dk., Green—G., Pink—P., and Color—Col.
[13]All amines are members of the JEFFAMINE ® Amine M, ED, D, and T series except DGDA which is diglycol diamine.

We claim:
1. A compound having the formula:

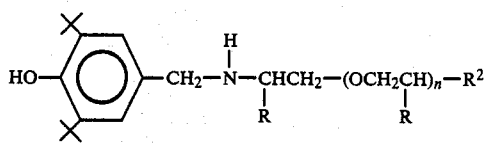

wherein (1) R represents hydrogen, —CH$_3$ or —CH$_2$CH$_3$; (2) n represents an integer having a value of 1 to 70, and (3) R$^2$ represents an alkoxy group having 1 to 20 carbon atoms,

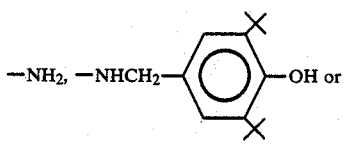

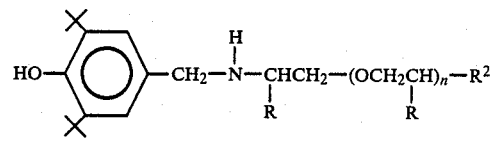

wherein R and n are defined as above, X represents hydrogen or an alkyl group containing from 1 to 3 carbon atoms, and R$^3$ represents hydrogen or

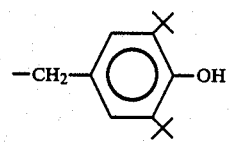

2. A compound as in claim 1 wherein R$^2$ represents an alkoxyl group having 1 to 20 carbon atoms.

3. A compound as in claim 1 wherein R$^2$ represents —NH$_2$.

4. A compound as in claim 1 wherein R$^2$ represents

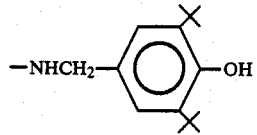

5. A compound as in claim 1 wherein R$^2$ represents

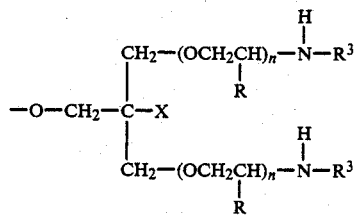

in which (a) R represents hydrogen, —CH$_3$ or —CH$_2$CH$_3$; (b) n represents an integer having a value of 1 to 70; (c) X represents hydrogen or an alkyl group containing from 1 to 3 carbon atoms; and (d) R$^3$ represents hydrogen or

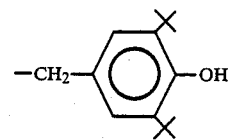

6. A compound having the formula:

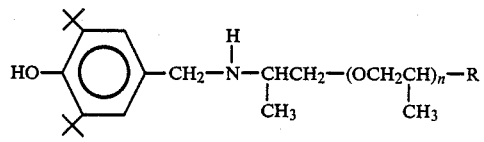

wherein (1) R represents hydrogen, —CH$_3$ or —CH$_2$CH$_3$; (2) n represents an integer having a value of about 2 to about 40, and (3) R$^2$ represents an alkoxy group having from 1 to 12 carbon atoms or an alkoxyethoxy group having from 1 to 12 carbon atoms.

7. A compound as in claim 6 wherein R represents a methyl group and R$^2$ represents an alkoxy group containing from 10 to 12 carbon atoms.

8. A compound as in claim 6 wherein R represents hydrogen or a methyl group and R$^2$ represents a butoxy group.

9. A compound as in claim 8 wherein the ratio of methyl groups to hydrogen is about 2:3.

10. A compound as in claim 6 wherein R represents a methyl group, n has a value of about 9, and R$^2$ represents a methoxyethoxy group.

11. A compound as in claim 6 wherein R is hydrogen or a methyl group and R$^2$ represents a methoxyethoxy group.

12. A compound as in claim 11 wherein the ratio of methyl groups to hydrogen is about 3:18.

13. A compound as in claim 11 wherein the ratio of methyl groups to hydrogen is about 32:2.

14. A compound as in claim 11 wherein the ratio of methyl groups to hydrogen is about 10:31.

15. A compound having the formula:

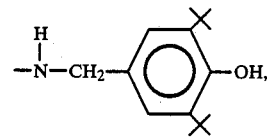

wherein R represents —NH$_2$ or n has a value of from about 2 to about 70.

16. A compound as in claim 15 wherein n has a value between 2 and 3.

17. A compound as in claim 15 wherein n has a value between 5 and 6.

18. A compound as in claim 15 wherein n has a value of about 33.

19. A compound as in claim 15 wherein n has a value of about 60.

20. A compound having the formula:

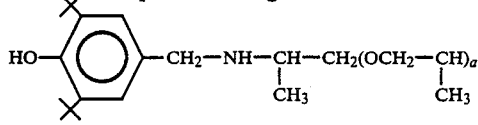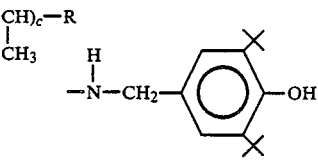

wherein R represents —NH$_2$ or

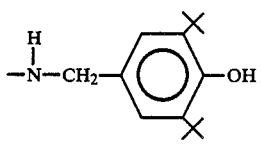

a+c equals about 2 to about 10 and b represents an integer having a value of about 1 to about 50.

21. A compound as in claim 20 wherein the value of b is about 8.5 and the value of a+c is about 2.5.

22. A compound as in claim 20 wherein the value of b is about 15.5 and the value of a+c is about 2.5.

23. A compound as in claim 20 wherein the value of b is about 40 and the value of a+c is about 2.5.

24. A compound having the formula:

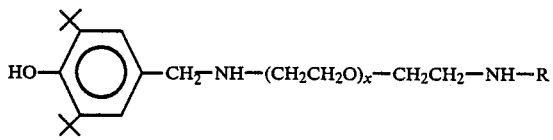

wherein R represents

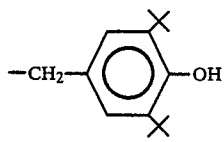

or H and x represents an integer having the value of 1 to 40.

25. A compound as in claim 24 wherein x represents an integer having the value of 3.

26. A compound having the formula:

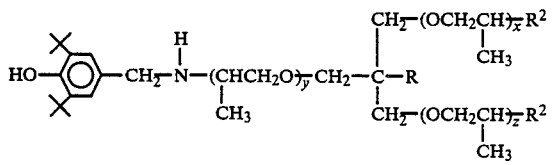

wherein R represents an alkyl group containing from 1 to 3 carbon atoms and x, y and z represent integers, the sum of which is from about 5 to about 90, and R$^2$ represents —NH$_2$ or 27. A process for preparing Mannich condensates comprising reacting 2,6-di-t-butylphenol with formaldehyde and a polyoxyalkylene amine having the formula:

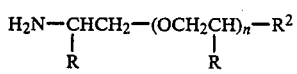

wherein
(a) R represents hydrogen, —CH$_3$ or —CH$_2$CH$_3$
(b) n represents an integer having a value of 1 to 70, and
(c) R$^2$ represents an alkoxyl group having 1 to 20 carbon atoms, —NH$_2$ or

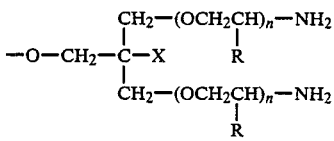

wherein R and n are defined as above, and X represents hydrogen or an akyl group containing from 1 to 3 carbon atoms.

28. The process of claim 27 wherein R$^2$ represents an alkoxyl group having 1 to 20 carbon atoms.

29. The process of claim 27 wherein R$^2$ represents —NH$_2$.

30. The process of claim 27 wherein R$^2$ represents

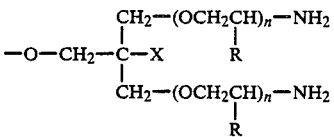

wherein
(a) R represents hydrogen, —CH$_3$ or CH$_2$CH$_3$;
(b) n represents an integer having a value of 1 to 70, and
(c) X represents an alkyl group containing from 1 to 3 carbon atoms.

31. The process of claim 28 wherein the reaction is conducted within a temperature range of about 0° C. to about 150° C. and at a pressure of atmospheric to about 1000 psig.

32. The process of claim 29 wherein the reaction is conducted within a temperature range of about 0° C. to about 150° C. and at a pressure of atmospheric to about 1000 psig.

33. The process of claim 30 wherein the reaction is conducted within a temperature range of about 0° C. to about 150° C. and at a pressure of atmospheric to about 1000 psig.

* * * * *